(12) United States Patent
Gao et al.

(10) Patent No.: US 11,126,875 B2
(45) Date of Patent: Sep. 21, 2021

(54) METHOD AND DEVICE OF MULTI-FOCAL SENSING OF AN OBSTACLE AND NON-VOLATILE COMPUTER-READABLE STORAGE MEDIUM

(71) Applicant: Baidu Online Network Technology (Beijing) Co., Ltd., Beijing (CN)

(72) Inventors: Han Gao, Beijing (CN); Guo Li, Beijing (CN); Xun Sun, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 164 days.

(21) Appl. No.: 16/508,918

(22) Filed: Jul. 11, 2019

(65) Prior Publication Data
US 2020/0089976 A1 Mar. 19, 2020

(30) Foreign Application Priority Data

Sep. 13, 2018 (CN) .......................... 201811068019.4

(51) Int. Cl.
*G06K 9/00* (2006.01)
*G06K 9/62* (2006.01)
*H04N 5/232* (2006.01)

(52) U.S. Cl.
CPC ..... *G06K 9/00825* (2013.01); *G06K 9/00805* (2013.01); *H04N 5/23218* (2018.08); *H04N 5/232122* (2018.08)

(58) Field of Classification Search
USPC ................................................ 382/103, 209
See application file for complete search history.

(56) References Cited

U.S. PATENT DOCUMENTS

| | | | |
|---|---|---|---|
| 8,611,585 B2 * | 12/2013 | Zhang | G06K 9/00798 382/100 |
| 9,082,014 B2 | 7/2015 | Terrazas et al. | |
| 9,812,838 B2 | 11/2017 | Villeneuve et al. | |

(Continued)

FOREIGN PATENT DOCUMENTS

| | | |
|---|---|---|
| CN | 101441076 A | 5/2009 |
| CN | 102663196 A | 9/2012 |

(Continued)

OTHER PUBLICATIONS

Japanese Office Action, Japanese Application No. 2019-128121, dated Jul. 2, 2020, 4 pages.

(Continued)

*Primary Examiner* — Kathleen Y Dulaney
(74) *Attorney, Agent, or Firm* — Patterson Thuente Pedersen, P.A.

(57) ABSTRACT

A method and device of multi-focal sensing of an obstacle. A method includes acquiring detection results of obstacles at multiple moments by utilizing a camera with long focus lens and a camera with short focus lens; performing a target tracking to the acquired detection results, to obtain at least two tracking sequences, wherein each tracking sequence includes detection results acquired at the multiple moments for a same obstacle; and matching two random tracking sequences of the at least two tracking sequences, and combining the two random tracking sequences into a combined tracking sequence, if the matching is successful.

9 Claims, 6 Drawing Sheets

```
acquiring detection results of obstacles at multiple moments by
utilizing a camera with long focus lens and a camera with short     S110
              focus lens, respectively performing a target tracking to the acquired detection results, to
   obtain at least two tracking sequences, wherein each tracking     S120
  sequence includes detection results acquired at the multiple
               moments for a same obstacle matching two random tracking sequences of the at least two
     tracking sequences, and combining the two random tracking      S130
  sequences into a combined tracking sequence, if the matching is
                          successful
```

(56) References Cited

U.S. PATENT DOCUMENTS

| | | | | |
|---|---|---|---|---|
| 10,067,509 B1* | 9/2018 | Wang | | G06K 9/66 |
| 10,621,779 B1* | 4/2020 | Topiwala | | G06T 7/62 |
| 10,668,936 B2* | 6/2020 | Gao | | G01S 17/88 |
| 2006/0098872 A1* | 5/2006 | Seo | | G06K 9/209 |
| | | | | 382/181 |
| 2010/0104199 A1* | 4/2010 | Zhang | | G08G 1/165 |
| | | | | 382/199 |
| 2010/0232712 A1* | 9/2010 | Tomita | | G06K 9/00228 |
| | | | | 382/209 |
| 2011/0025548 A1* | 2/2011 | Nickolaou | | G01S 13/931 |
| | | | | 342/52 |
| 2011/0063446 A1* | 3/2011 | McMordie | | G06K 9/209 |
| | | | | 348/159 |
| 2014/0334668 A1* | 11/2014 | Saund | | G06T 7/20 |
| | | | | 382/103 |
| 2016/0155011 A1* | 6/2016 | Sulc | | G06K 9/00671 |
| | | | | 382/103 |
| 2017/0092000 A1 | 3/2017 | Schwimmer | | |
| 2017/0261318 A1 | 9/2017 | Takagi et al. | | |
| 2019/0129134 A1* | 5/2019 | Chino | | G03B 3/10 |
| 2019/0147582 A1* | 5/2019 | Lee | | G06T 11/00 |
| | | | | 382/156 |
| 2019/0187725 A1* | 6/2019 | Zhang | | B64C 39/024 |
| 2019/0300031 A1* | 10/2019 | Gao | | G01S 17/88 |
| 2020/0026283 A1* | 1/2020 | Barnes | | G05D 1/0088 |

FOREIGN PATENT DOCUMENTS

| | | |
|---|---|---|
| CN | 103258338 A | 8/2013 |
| CN | 103914830 A | 7/2014 |
| CN | 104020674 A | 9/2014 |
| CN | 104331910 A | 11/2014 |
| CN | 104183014 A | 12/2014 |
| CN | 104376297 A | 2/2015 |
| CN | 104457569 A | 3/2015 |
| CN | 104899855 A | 9/2015 |
| CN | 104933708 A | 9/2015 |
| CN | 104950883 A | 9/2015 |
| CN | 105761308 A | 7/2016 |
| CN | 105844600 A | 8/2016 |
| CN | 105957145 A | 9/2016 |
| CN | 106204457 A | 12/2016 |
| CN | 106462757 A | 2/2017 |
| CN | 106599832 A | 4/2017 |
| CN | 106845412 A | 6/2017 |
| CN | 106919908 A | 7/2017 |
| CN | 106997049 A | 8/2017 |
| CN | 107103627 A | 8/2017 |
| CN | 107657237 A | 2/2018 |
| CN | 107659774 A | 2/2018 |
| CN | 107678306 A | 2/2018 |
| CN | 107818293 A | 3/2018 |
| CN | 107832806 A | 3/2018 |
| CN | 107993512 A | 5/2018 |
| CN | 108010360 A | 5/2018 |
| CN | 108156419 A | 6/2018 |
| CN | 108256506 A | 7/2018 |
| CN | 108323190 A | 7/2018 |
| CN | 108492356 A | 9/2018 |
| JP | 2015079223 A | 4/2015 |
| JP | 2017091273 A | 5/2017 |
| JP | 2018060512 A | 4/2018 |
| KR | 20160047087 A | 5/2016 |
| RO | 132599 A2 | 5/2018 |
| TW | 200945245 A | 11/2009 |
| TW | 201643063 A | 12/2016 |
| WO | WO 2012/001755 A1 | 8/2013 |

OTHER PUBLICATIONS

Abdelhamid Mammeri, et al., "Extending the Detection Range of Vision-Based Vehicular Instrumentation", IEEE: Transactions on Instrumentation and Measurement, vol. 65, No. 4, Apr. 2016, 18 pages.
CN Application No. 201811068019.4, First Office Action dated May 28, 2019, 16 pages.
CN Application No. 201811068019.4, Notification to Grant Patent Right for Invention dated Jul. 29, 2019, 3 pages.
CN Application No. 201811068019.4, Search Report dated May 20, 2019, 4 pages.
CN Application No. 201811068019.4, Supplementary Search Report dated Jul. 17, 2019, 4 pages.
Extended European Search Report, Application No. 19184448.9, dated Jan. 27, 2020, 8 pages.
Mammeri Abdelhamid et al., "Extending the Detection Range of Vision-Based Vehicular Instrumentation," IEEE Transactions on Instrumentation and Measurement, IEEE Service Center, Piscataway, NJ, US, vol. 65, No. 4, Apr. 1, 2016, pp. 856-873, XP011602110, ISSN: 0018-9456, DOI: 10.1109/TIM.2016.2514780.

* cited by examiner

METHOD AND DEVICE OF MULTI-FOCAL SENSING OF AN OBSTACLE AND NON-VOLATILE COMPUTER-READABLE STORAGE MEDIUM

CROSS-REFERENCE TO RELATED APPLICATION

This application claims priority to Chinese Patent Application No. 201811068019.4, filed on Sep. 13, 2018, which is hereby incorporated by reference in its entirety.

TECHNICAL FIELD

The present application relates to a field of unmanned vehicle technology, and in particular, to a method, device of multi-focal sensing of an obstacle and a non-volatile computer-readable storage medium.

BACKGROUND

For unmanned vehicle sensing systems, effective perception of distance is a very critical indicator. A camera with short focus lens has a wide field of view, and obstacles in the field of view are not liable to be cut off, which facilitates an association with and a tracking of obstacles, whereas there exists an issue of short sensing distance. A camera with long focus lens has a narrow field of view. A visual observation obtained by using a camera with the long focus lens is more accurate when a single obstacle is large. Further, a camera with long focus lens is liable to be used to detect small obstacles and is suitable for a detection of medium and long distance obstacles.

In existing obstacle sensing techniques, only a single camera with short focus lens or a single camera with long focus lens is used to detect and track obstacles. In this manner, a challenge balancing field of view and sight distance is presented. In other words, if a camera with short focus lens is utilized to detect and track obstacles, the coverage range can be relatively large, however, sight distance is too short. On the other hand, if a camera with long focus lens is utilized to detect and track obstacles, sight distance is relatively long, however, the coverable range can be small.

SUMMARY

Methods and devices for multi-focal sensing of an obstacle are provided according to embodiments, so as to at least solve the above technical problems in existing technologies.

In an embodiment, a method of multi-focal sensing of an obstacle includes acquiring detection results of obstacles at multiple moments by utilizing a camera with long focus lens and a camera with short focus lens, respectively; performing a target tracking to the acquired detection results, to obtain at least two tracking sequences, wherein each tracking sequence includes detection results acquired at the multiple moments for a same obstacle; and matching two random tracking sequences of the at least two tracking sequences, and combining the two random tracking sequences into a combined tracking sequence, if the matching is successful.

In embodiments, matching two random tracking sequences of the at least two tracking sequences includes selecting the two random tracking sequences from the at least two tracking sequences; acquiring, for each moment, detection results from the selected two tracking sequences respectively, and projecting detection results acquired by the camera with the long focus lens onto an imaging plane acquired by the camera with the short focus lens, if the detection results are acquired by cameras with different focus lenses, and calculating an Intersection over Union (IoU) of the projected detection results and detection results acquired by the camera with the short focus lens; determining an average of the IoUs calculated for the multiple moments; and determining the matching of the selected two tracking sequences is successful if the average is greater than a preset threshold.

In embodiments, combining the two random tracking sequences into a combined tracking sequence includes combining detection results of the two random tracking sequences to obtain a combined tracking sequence.

In embodiments, a method of multi-focal sensing of an obstacle further includes acquiring a new detection result, and determining whether the new detection result is correlated with the combined tracking sequence; creating a new tracking sequence if the new detection result is not correlated with the combined tracking sequence, wherein the new tracking sequence includes the new detection result; or incorporating the new detection results into the combined tracking sequence if the new detection result is correlated with the combined tracking sequence.

In embodiments, a device of multi-focal sensing of an obstacle includes an initial processing module, configured to perform a target tracking to detection results of obstacles acquired by a camera with long focus lens and a camera with short focus lens, respectively, to obtain at least two tracking sequences, wherein each tracking sequence includes the detection results acquired at multiple moments for a same obstacle; and a combination module, configured to match two random tracking sequences of the at least two tracking sequences, and to combine the two random tracking sequences into a combined tracking sequence, if the matching is successful.

In embodiments, the combination module is configured for selecting the two random tracking sequences from the at least two tracking sequences; acquiring, for each moment, detection results from the selected two tracking sequences, respectively, and projecting detection results acquired by the camera with the long focus lens onto an imaging plane acquired by the camera with the short focus lens, if the detection results are acquired by cameras with different focus lenses, and calculating an Intersection over Union (IoU) of the projected detection results and detection results acquired by the camera with the short focus lens; and determining an average of the IoUs calculated for the multiple moments; and determining the matching of the selected two tracking sequences is successful if the average is greater than a preset threshold.

In embodiments, the combination module is configured for combining detection results of the two random tracking sequences to obtain a combined tracking sequence if the matching is successful.

In embodiments, the device further includes: a correlation module, configured to acquire a new detection result, and to determine whether the new detection result is correlated with the combined tracking sequence, to create a new tracking sequence if the new detection result is not correlated with the combined tracking sequence, wherein the new tracking sequence includes the new detection result, or to incorporate the new detection result into the combined tracking sequence if the new detection result is correlated with the combined tracking sequence.

One of the above technical solutions has the following advantages or beneficial effects. According to embodiments of the present application, detection results of obstacles are acquired at multiple moments by utilizing a camera with long focus lens and a camera with short focus lens, respectively, and a target tracking is performed in respective cameras to create different tracking sequences. Thereafter, two random tracking sequences of the at least two tracking sequences are matched, if the matching is successful, the two random tracking sequences acquired by cameras with different focus lenses are combined, in this way, a contradiction between a field of view of tracking and a sight distance existing in the prior art may be solved.

The above summary is for the purpose of the specification only and is not intended to be limiting in any way. In addition to the illustrative aspects, embodiments, and features described above, further aspects, embodiments, and features of the present disclosure will be readily understood by reference to the drawings and the following detailed description.

BRIEF DESCRIPTION OF THE DRAWINGS

In the drawings, unless otherwise specified, identical or similar parts or elements are denoted by identical reference signs throughout several figures of the accompanying drawings. The drawings are not necessarily drawn to scale. It should be understood that these drawings merely illustrate some embodiments, and should not be construed as limiting the scope of the disclosure.

Figure 1:
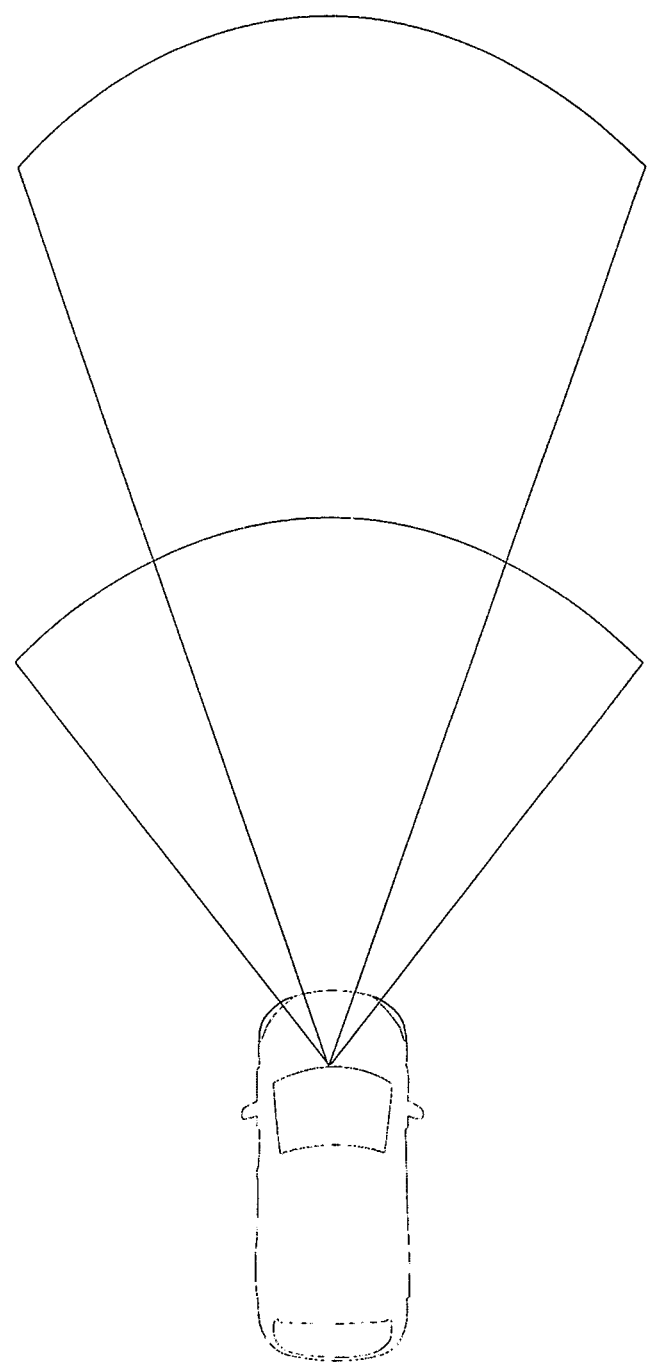
FIG. 1 is a schematic diagram showing a setting manner and fields of view of a camera with long focus lens and a camera with short focus lens, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In the following, only certain example embodiments are briefly described. As those skilled in the art would realize, the described embodiments may be modified in various different ways, all without departing from the spirit or scope of the present disclosure. Accordingly, the drawings and description are to be regarded as illustrative in nature and not restrictive.

According to embodiments of the present disclosure, a method and device of multi-focal sensing of an obstacle are provided. Hereafter, detailed description is made with respect to the technical solutions by way of the following embodiments.

First Embodiment

A method of multi-focal sensing of an obstacle is provided, according to the present embodiment. In an embodiment, a camera with long focus lens and a camera with short focus lens are both provided in the unmanned vehicle sensing system for capturing images. FIG. 1 is a schematic diagram showing a setting manner and fields of view of a camera with long focus lens and a camera with short focus lens, according to an embodiment. In FIG. 1, a camera with long focus lens and a camera with short focus lens are provided at the same position in the front of the unmanned vehicle. For example, the camera with long focus lens can have a focal length of 12 mm, and the camera with short focus lens can have a focal length of 6 mm. In FIG. 1, the sector area with smaller angle represents a field of view of the camera with the long focus lens, and the sector area with larger angle represents a field of view of the camera with the short focus lens.

It should be noted that an arrangement of a camera with long focus lens and a camera with short focus lens in the front of a vehicle in the present embodiment is merely an illustration. In other embodiments of the present disclosure, a camera with long focus lens and a camera with short focus lens can be disposed at other positions of an unmanned vehicle. Further, a plurality of sets of cameras with long focus lens and cameras with short focus lens can be disposed at different positions of an unmanned vehicle.

Figure 2A:
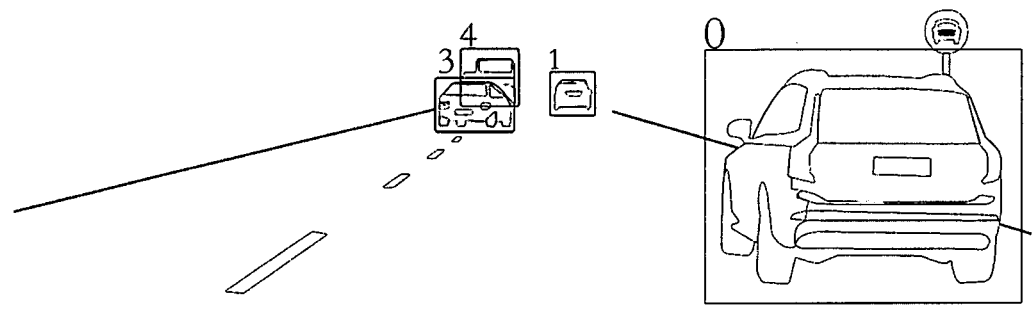
FIG. 2a is a schematic diagram of an image captured by a camera with long focus lens, according to an embodiment.
Figure 2B:
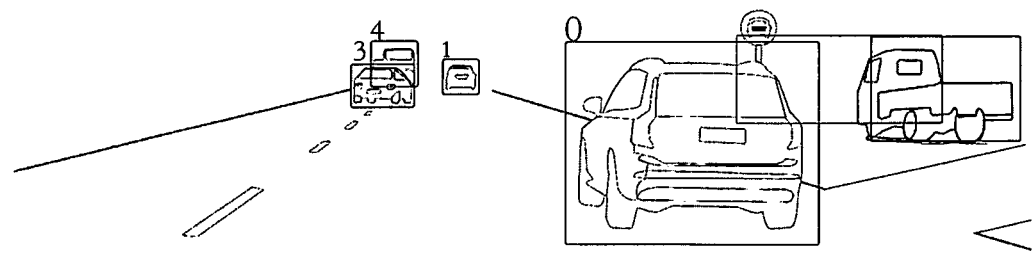
FIG. 2b is a schematic diagram of an image captured by a camera with short focus lens, according to an embodiment.

FIG. 2a and FIG. 2b show schematic diagrams of images captured by a camera with long focus lens and a camera with short focus lens, respectively, wherein the cameras are disposed in the front of the vehicle.

FIG. 2a is a schematic diagram of an image captured by a camera with long focus lens. Compared with FIG. 2b, the objects at distant locations shown in FIG. 2a can be clearly recognized, however, the field of view is relatively small. FIG. 2b is a schematic diagram of an image captured by a camera with short focus lens. Compared with FIG. 2a, the field of view in FIG. 2b is relatively large, however, the objects at distant locations cannot be clearly recognized.

It can be seen that the objects in the image of FIG. 2a can be fully included in FIG. 2b. If FIG. 2a is appropriately scaled down, the reduced image will coincide with the corresponding portions of FIG. 2b.

Figure 3:
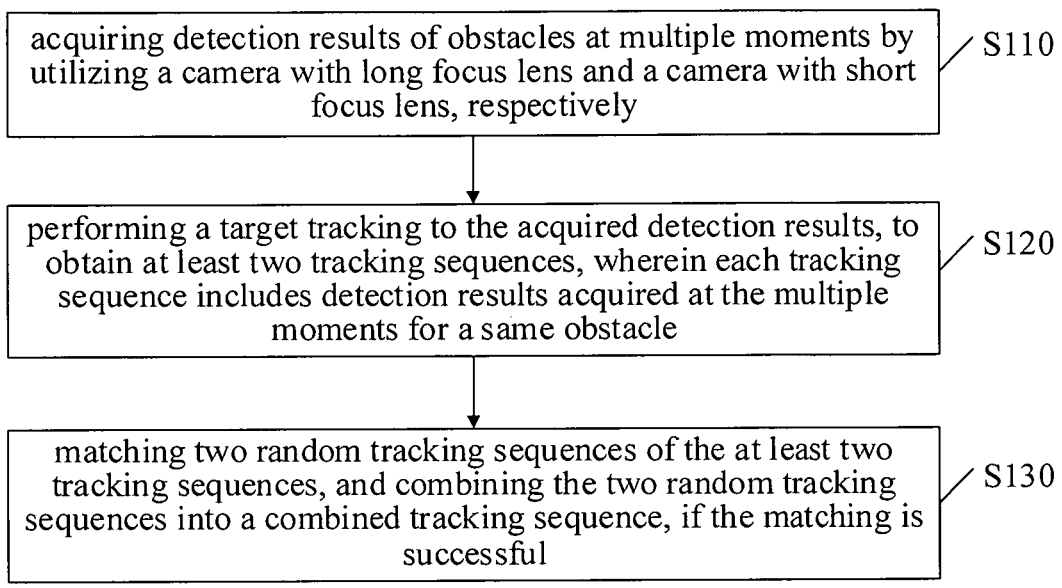
FIG. 3 is a schematic diagram of a method of multi-focal sensing of an obstacle, according to an embodiment.

FIG. 3 is a schematic diagram of a method of multi-focal sensing of an obstacle, according an embodiment. At S110, the method includes acquiring detection results of obstacles at multiple moments by utilizing a camera with long focus lens and a camera with short focus lens, respectively.

Both in the present embodiment and in other embodiments of the specification of the present disclosure, "obstacles" can be understood in a broad sense, for example, pedestrians, bicycles, electric vehicles, any other type of non-motor vehicles or motor vehicles around a present motor vehicle can be all considered as obstacles relative to the present vehicle (motor vehicle).

After the detection results of obstacles are acquired, a target tracking is independently performed in the respective cameras at an initial stage, at S120.

At S120, the method includes performing a target tracking to the acquired detection results, to obtain at least two tracking sequences, wherein each tracking sequence includes detection results acquired at the multiple moments for a same obstacle.

At S120, a target tracking to the detection results acquired by two cameras with different focus lenses are performed, respectively. For a same obstacle, if a camera with long focus lens and a camera with short focus lens acquire detection results, two tracking sequences can be created for this obstacle. These two tracking sequences are then acquired by a camera with long focus lens and a camera with short focus lens, respectively.

The specific operations for target tracking can be by performing a similarity calculation on the detection results, determining a match by calculating a similarity matrix, and determining a correlation of the detection results, for example, thereby obtaining a tracking sequence.

At S130, the method includes matching two random tracking sequences of the at least two tracking sequences, and combining the two random tracking sequences into a combined tracking sequence, if the matching is successful.

At S130, two tracking sequences refer to a same obstacle and come from different cameras, if a matching is successful. Therefore, the two tracking sequences can be combined into a combined tracking sequence to achieve a fusion of tracking sequence across cameras.

Figure 4:
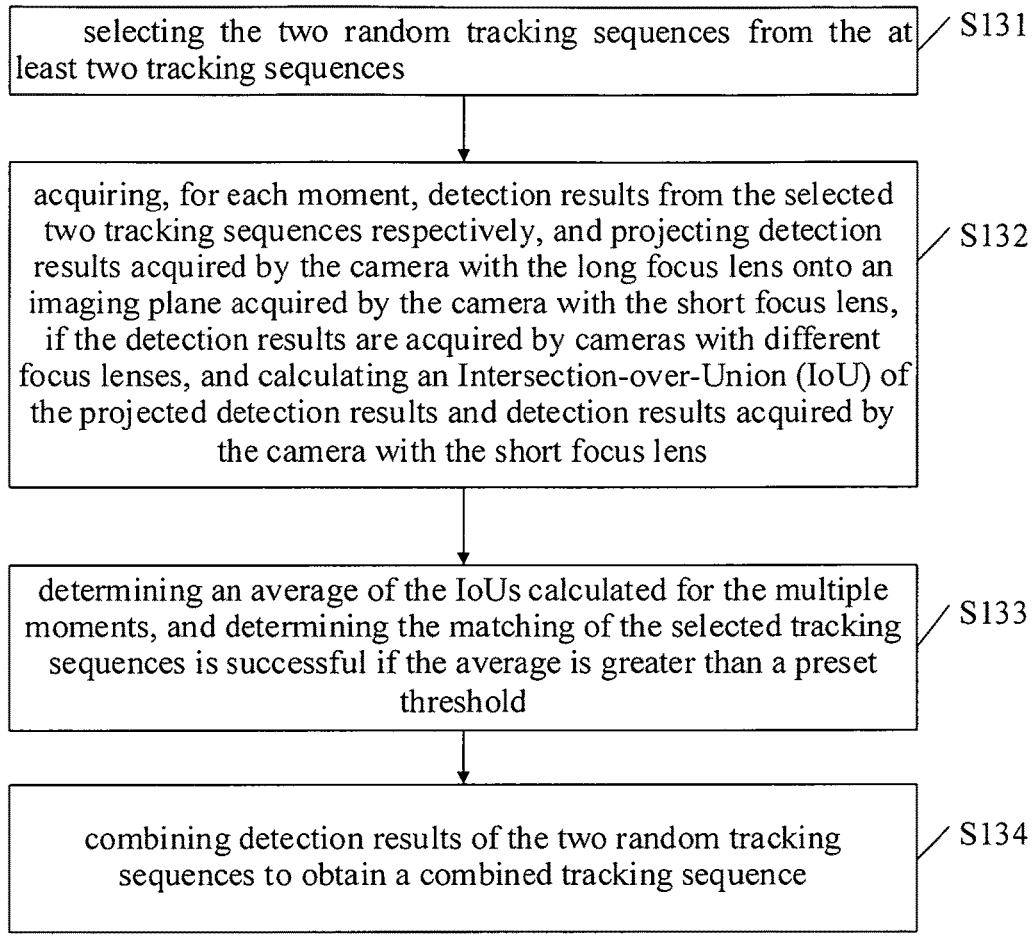
FIG. 4 is a flowchart for a portion of the method of FIG. 3, according to an embodiment.

FIG. 4 is a flowchart for an implementation of S130 according to an embodiment. At S131, the method further includes selecting the two random tracking sequences from the at least two tracking sequences. For example, two random tracking sequences Ta and Tb can be selected from at least two existing tracking sequences, where Ta and Tb include a plurality of detection results, respectively.

At S132, the method further includes acquiring, for each moment, detection results from the selected two tracking sequences respectively, and projecting detection results acquired by the camera with the long focus lens onto an imaging plane acquired by the camera with the short focus lens, if the detection results are acquired by cameras with different focus lenses, and calculating an Intersection-over-Union (IoU) of the projected detection results and detection results acquired by the camera with the short focus lens.

At S133, the method further includes determining an average of the IoUs calculated for the multiple moments, and determining the matching of the selected tracking sequences is successful if the average is greater than a preset threshold.

At S134, the method further includes combining detection results of the two random tracking sequences to obtain a combined tracking sequence if the matching is successful.

Specifically, di and dj can be detection results acquired at each moment from the tracking sequences Ta and Tb, as follows:

$$d_i \in T_a, d_j \in T_b, \text{Timestamp}(d_i) = \text{Timestamp}(d_j)$$

where di are detection results acquired from the tracking sequence Ta, dj are detection results acquired from the tracking sequence Tb, and di and dj are detection results acquired at a same moment.

If the above two detection results are acquired by cameras with different focus lenses, the detection result acquired by the camera with long focus lens can be projected onto an imaging plane acquired by the camera with short focus lens, so as to calculate an IoU of the projected detection results and the detection results acquired by the camera with short focus lens. The projection can be performed by using a pure rotation model.

The closer the IoU is to 1, the more the two detection results overlap, and the more likely that the two detection results are acquired for a same obstacle at a same moment.

For detection results acquired at all of the same moments from the two tracking sequences, the average of the above-mentioned IoU can be determined, and the matching of the two tracking sequences can be determined as being successful if the average is greater than a preset threshold.

After the determination of a successful match, the matched two tracking sequences can be combined. For example, the combined tracking sequence is a track={d1, d2, d3, ... dn}, where di (i=1, 2, ... , n) can be either the detection results acquired by a camera with long focus lens or the detection results acquired by a camera with short focus lens.

Figure 5:
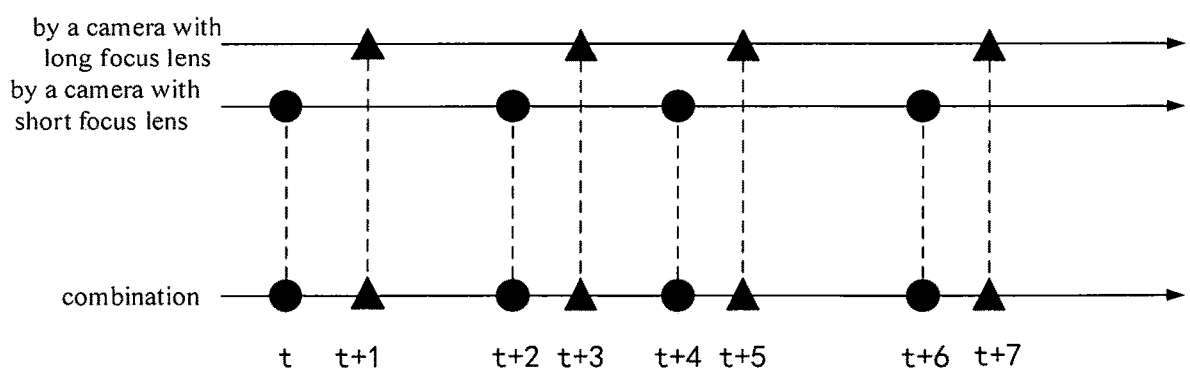
FIG. 5 is a schematic diagram showing a combination of tracking sequences, according to an embodiment.

FIG. 5 is a schematic diagram showing a combination of tracking sequences according to an embodiment. In FIG. 5, after determining that two tracking sequences acquired by a camera with long focus lens and a camera with short focus lens are matched, the detection results of the tracking sequence acquired by the camera with the long focus lens (represented by triangles in FIG. 5) and the detection results of the tracking sequence acquired by the camera with the short focus lens (represented by circles in FIG. 5) are combined into a combined tracking sequence.

Second Embodiment

Figure 6:
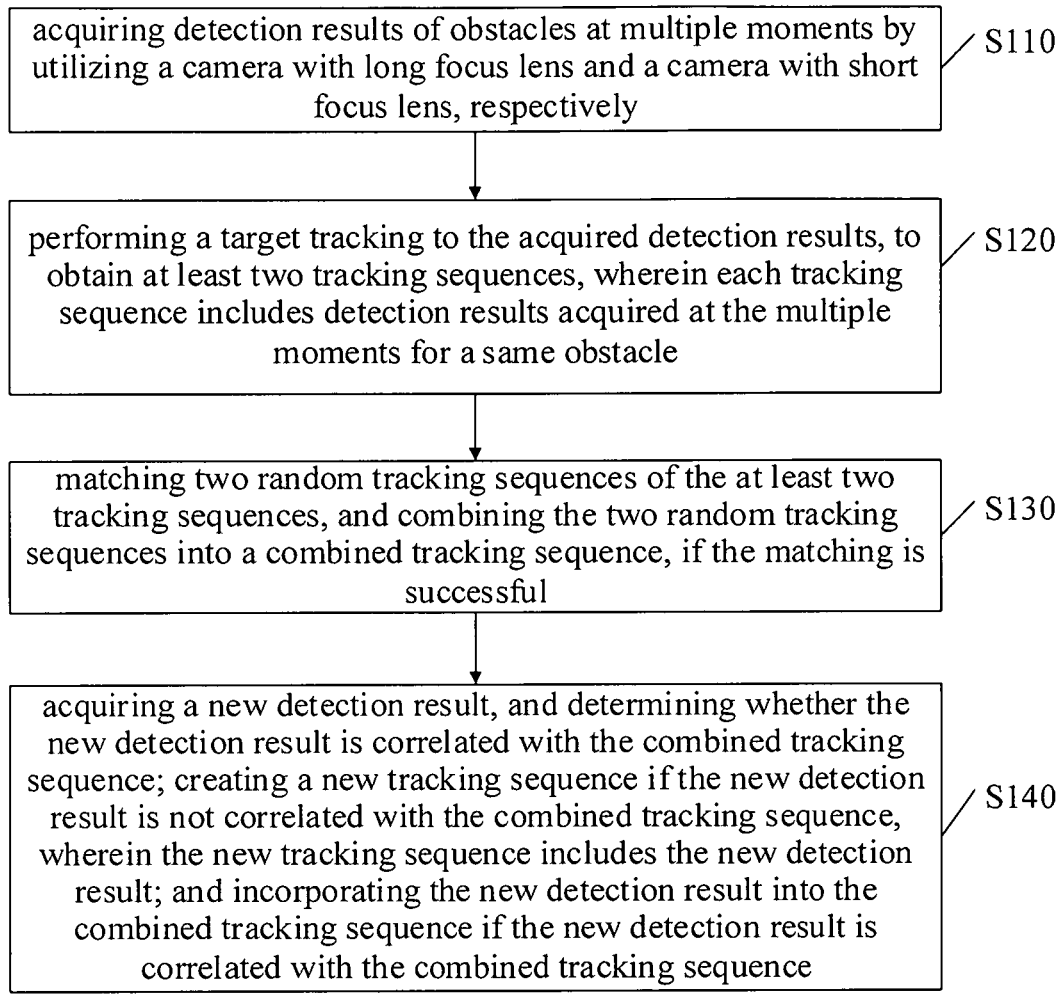
FIG. 6 is a schematic diagram of a method of multi-focal sensing of an obstacle according to another embodiment.

Another method of multi-focal sensing of an obstacle is provided according to an embodiment. FIG. 6 is a schematic diagram of a method of multi-focal sensing of an obstacle according to an embodiment. The method includes at S110, acquiring detection results of obstacles at multiple moments by utilizing a camera with long focus lens and a camera with short focus lens, respectively.

At S120, the method includes performing a target tracking to the acquired detection results, to obtain at least two tracking sequences, wherein each tracking sequence includes detection results acquired at the multiple moments for a same obstacle.

At S130, the method includes matching two random tracking sequences of the at least two tracking sequences, and combining the two random tracking sequences into a combined tracking sequence, if the matching is successful.

Because the above-mentioned S110-S130 can be the specific manners of S110-S130 in the first embodiment, detailed descriptions thereof are omitted herein.

By performing S110 to S130, an initial stage, i.e., a combination of tracking sequences is completed. During the subsequent process, a new detection result can be directly associated with the combined tracking sequence, no matter by which camera it is acquired. That is, the following S140 is performed.

At S140, the method further includes acquiring a new detection result, and determining whether the new detection result is correlated with the combined tracking sequence; creating a new tracking sequence if the new detection result is not correlated with the combined tracking sequence, wherein the new tracking sequence includes the new detection result, and incorporating the new detection result into the combined tracking sequence if the new detection result is correlated with the combined tracking sequence.

By applying the above, according to the embodiment of the present disclosure, a fusion of tracking sequences acquired by a camera with long focus lens and a camera with short focus lens is implemented, thereby realizing a multi-focal sensing of an obstacle.

Third Embodiment

Figure 7:
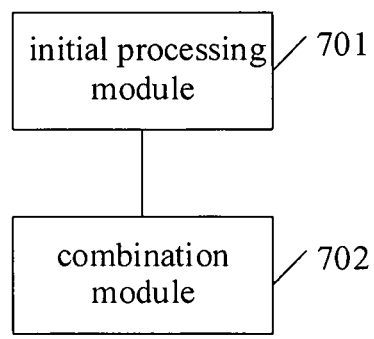
FIG. 7 is a schematic diagram of a device of multi-focal sensing of an obstacle according to an embodiment.

A device of multi-focal sensing of an obstacle is provided, according to an embodiment. FIG. 7 is a schematic diagram of a device of multi-focal sensing of an obstacle according to an embodiment. The device includes: an initial processing module 701, configured to perform a target tracking to detection results of obstacles acquired by a camera with long focus lens and a camera with short focus lens, respectively, to obtain at least two tracking sequences, wherein each tracking sequence includes detection results acquired at multiple moments for a same obstacle; and a combination module 702, configured to match two random tracking sequences of the at least two tracking sequences, and to combine the two random tracking sequences into a combined tracking sequence, if the matching is successful.

In embodiments, the combination module 702 can be configured for: selecting the two random tracking sequences from the at least two tracking sequences; acquiring, for each moment, detection results from the selected two tracking sequences respectively, and projecting detection results acquired by the camera with the long focus lens onto an imaging plane acquired by the camera with the short focus lens, if the detection results are acquired by cameras with different focus lenses, and calculating an IoU of the projected detection results and detection results acquired by the camera with the short focus lens; determining an average of the IoUs calculated for the multiple moments; and determining the matching of the selected two tracking sequences is successful if the average is greater than a preset threshold.

In embodiments, combining detection results of the two random tracking sequences to obtain a combined tracking sequence if the matching is successful.

For example, di and dj can be detection results acquired at each moment from two random tracking sequences Ta and Tb:

$$d_i \in T_a, d_j \in T_b, \text{Timestamp}(d_i) = \text{Timestamp}(d_j)$$

where di are detection results acquired from the tracking sequence Ta, dj are detection results acquired from the tracking sequence Tb, and time stamps of di and dj are the same, namely, di and dj are detection results acquired at a same moment.

If the above-mentioned two detection results are acquired by cameras with different focus lenses, the detection results acquired by the camera with long focus lens can be projected onto an imaging plane acquired by the camera with short focus lens, so as to calculate an IoU of the projected detection results and the detection results acquired by the camera with the short focus lens. The projection can be performed by using a pure rotation model.

The closer the IoU is to 1, the more the two detection results overlap, and the more likely the two detection results are acquired for a same obstacle at a same moment.

For detection results acquired at all of the same moments from the two tracking sequences, the average of the above-mentioned IoU can be determined, and the matching of the two tracking sequences can be determined as being successful if the average is greater than a preset threshold.

After the determination of a successful match, the matched two tracking sequences can be combined. That is, the detection results of the matched two tracking sequences are combined to obtain a combined tracking sequence.

For example, the combined tracking sequence is a track={d1, d2, d3, . . . dn}, where di (i=1, 2, . . . , n) can be either the detection results acquired by a camera with long focus lens or the detection results acquired by a camera with short focus lens.

In embodiments, a fusion of tracking sequences acquired by a camera with long focus lens and a camera with short focus lens is implemented by using the device of multi-focal sensing of an obstacle provided by the embodiment of the present disclosure, thereby realizing a multi-focal sensing of an obstacle.

Fourth Embodiment

Figure 8:
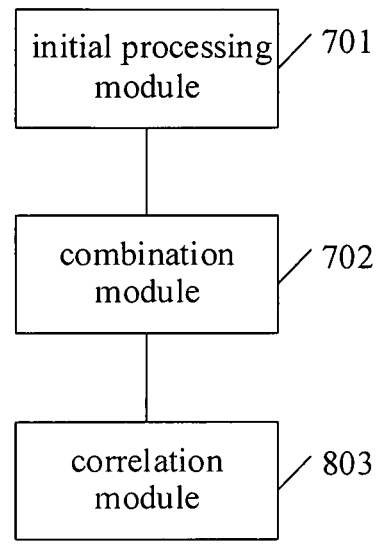
FIG. 8 is a schematic diagram of a device of multi-focal sensing of an obstacle according to another embodiment.

Another device of multi-focal sensing of an obstacle is provided according to an embodiment. FIG. 8 is a schematic diagram of a device of multi-focal sensing of an obstacle according an embodiment. The device includes: an initial processing module 701, configured to perform a target tracking to detection results of obstacles acquired by a camera with long focus lens and a camera with short focus lens, respectively, to obtain at least two tracking sequences, wherein each tracking sequence includes detection results acquired at multiple moments for a same obstacle; and a combination module 702, configured to match two random tracking sequences of the at least two tracking sequences, and to combine the two random tracking sequences into a combined tracking sequence, if the matching is successful.

In an embodiment, the combination module 702 can be configured for selecting the two random tracking sequences from the at least two tracking sequences; acquiring, for each moment, detection results from the selected two tracking sequences respectively, and projecting detection results acquired by the camera with the long focus lens onto an imaging plane acquired by the camera with the short focus lens, if the detection results are acquired by cameras with different focus lenses, and calculating an IoU of the projected detection results and detection results acquired by the camera with the short focus lens; determining an average of the IoUs calculated for the multiple moments; determining the matching of the selected two tracking sequences is successful if the average is greater than a preset threshold; and combining detection results of the two random tracking sequences to obtain a combined tracking sequence if the matching is successful.

In embodiments, the device can further include a correlation module 803, configured to acquire a new detection result, and to determine whether the new detection result is correlated with the combined tracking sequence, to create a new tracking sequence if the new detection result is not correlated with the combined tracking sequence, wherein the new tracking sequence includes the new detection result, and to incorporate the new detection result into the combined tracking sequence if the new detection result is correlated with the combined tracking sequence.

Thus, a fusion of tracking sequences acquired by a camera with long focus lens and a camera with short focus lens is implemented by using the device of multi-focal sensing of an obstacle provided by the embodiment of the present disclosure, thereby realizing a multi-focal sensing of an obstacle. After a combination, a similarity calculation and a correlation can be implemented by using detection results of a new frame and a combined tracking sequence, thereby implementing a direct tracking to the detection results acquired by two cameras.

Fifth Embodiment

Figure 9:
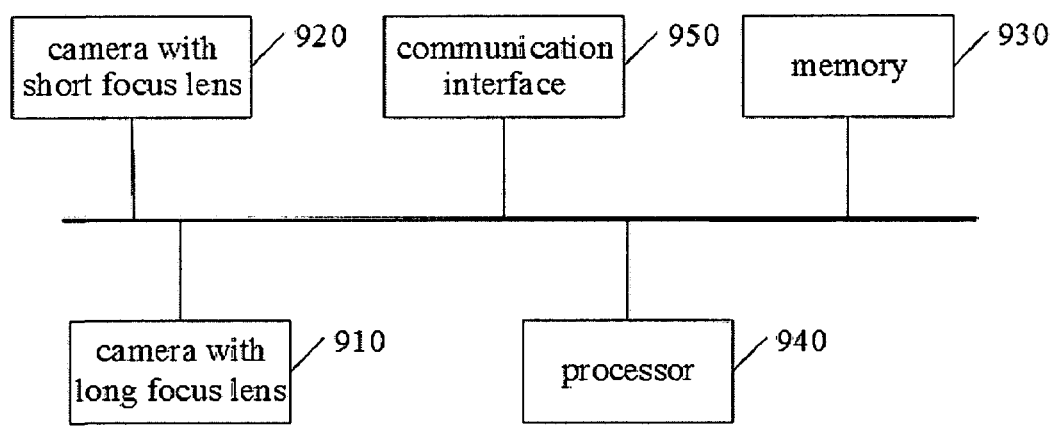
FIG. 9 is a schematic structural diagram of an apparatus of multi-focal sensing of an obstacle according to an embodiment.

An apparatus of multi-focal sensing of an obstacle is provided according an embodiment. FIG. 9 is a schematic structural diagram of an apparatus of multi-focal sensing of an obstacle according an embodiment. The apparatus includes: a camera with long focus lens 910 for acquiring detection results of obstacles; a camera with short focus lens 920 for acquiring detection results of obstacles; and a controller including a memory 930 and a processor 940, wherein the memory 930 has computer programs stored thereon, and the computer programs are executed by the processor 940 to cause the processor 940 to implement the method of multi-focal sensing of an obstacle according to above embodiments. The number of either the memory 930 or the processor 940 can be one or more.

The apparatus can further include: a communication interface 950, configured to communicate with an external device to perform data interaction and transmission. The memory 930 can include a high-speed RAM memory, or can also include a non-volatile memory, such as at least one disk memory. If the memory 930, the processor 940 and the communication interface 950 are implemented independently, the memory 930, the processor 940 and the communication interface 950 can be connected to one another via a bus so as to realize mutual communication. The bus can be an industry standard architecture (ISA) bus, a peripheral component interconnect (PCI) bus, an extended industry standard architecture (EISA) bus, or the like. The bus can be categorized into an address bus, a data bus, a control bus and so on. For ease of illustration, only one bold line is shown in FIG. 9 to represent the bus, but it does not mean that there is only one bus or only one type of bus.

Optionally, in an embodiment, if the memory 930, the processor 940 and the communication interface 950 are integrated on one chip, then the memory 930, the processor 940 and the communication interface 950 can complete mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present disclosure. Furthermore, the specific features, structures, materials, or characteristics described can be combined in any suitable manner in any one or more of the embodiments or examples. In addition, different embodiments or examples described in this specification and features of different embodiments or examples can be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" can explicitly or implicitly include at least one of the features. In the description of the present disclosure, "a plurality of" means two or more, unless expressly limited otherwise.

Any process or method descriptions described in flowcharts or otherwise herein can be understood as representing modules, segments or portions of code that include one or more executable instructions for implementing the steps of a particular logic function or process. The scope of the preferred embodiments of the present disclosure includes additional embodiments where the functions are not performed in the order shown or discussed, including according to the functions involved, in substantially simultaneous or in reverse order, which should be understood by those skilled in the art to which the embodiment of the present disclosure belongs.

Logic and/or steps, which are represented in the flowcharts or otherwise described herein, for example, can be thought of as a sequencing listing of executable instructions for implementing logic functions, which can be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" can be any device that can contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium can even be paper or other suitable medium upon which the program can be printed, as it can be read, for example, by optical scanning of the paper or other medium, followed by editing, interpretation or, where appropriate, process otherwise to electronically obtain the program, which is then stored in a computer memory.

It should be understood that various portions of the present disclosure can be implemented by hardware, software, firmware, or a combination thereof. In the above embodiments, multiple steps or methods can be implemented in software or firmware stored in memory and executed by a suitable instruction execution system. For example, if implemented in hardware, as in another embodiment, they can be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art can understand that all or some of the steps carried in the methods in the foregoing embodiments can be implemented by a program instructing relevant hardware. The program can be stored in a computer-readable storage medium, and when executed, one of the steps of the method embodiment or a combination thereof is included.

In addition, each of the functional units in the embodiments of the present disclosure can be integrated in one processing module, or each of the units can exist alone physically, or two or more units can be integrated in one module. The above-mentioned integrated module can be implemented in the form of hardware or in the form of software functional module. When the integrated module is implemented in the form of a software functional module and is sold or used as an independent product, the integrated module can also be stored in a computer-readable storage medium. The storage medium can be a read only memory, a magnetic disk, an optical disk, or the like.

The foregoing descriptions are merely specific embodiments of the present disclosure, but not intended to limit the protection scope of the present disclosure. Those skilled in the art can easily conceive of various changes or modifications within the technical scope disclosed herein, all these should be covered within the protection scope of the present disclosure. Therefore, the protection scope of the present disclosure should be subject to the protection scope of the claims.

Various embodiments of systems, devices, and methods have been described herein. These embodiments are given only by way of example and are not intended to limit the scope of the claimed inventions. It should be appreciated, moreover, that the various features of the embodiments that have been described can be combined in various ways to produce numerous additional embodiments. Moreover, while various materials, dimensions, shapes, configurations and locations, etc. have been described for use with disclosed embodiments, others besides those disclosed can be utilized without exceeding the scope of the claimed inventions.

Persons of ordinary skill in the relevant arts will recognize that the subject matter hereof can comprise fewer features than illustrated in any individual embodiment described above. The embodiments described herein are not meant to be an exhaustive presentation of the ways in which the various features of the subject matter hereof can be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim can refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for multi-focal sensing of an obstacle, comprising:
    acquiring detection results of obstacles at multiple moments by utilizing a camera with long focus lens and a camera with short focus lens;
    performing a target tracking to the acquired detection results, to obtain at least two tracking sequences, wherein each tracking sequence comprises detection results acquired at the multiple moments for a same obstacle; and
    matching two random tracking sequences of the at least two tracking sequences, and combining the two random tracking sequences into a combined tracking sequence, if the matching is successful.

2. The method according to claim 1, wherein the matching two random tracking sequences of the at least two tracking sequences comprises:
    selecting the two random tracking sequences from the at least two tracking sequences;
    acquiring, for each moment, detection results from the selected two tracking sequences respectively, and projecting detection results acquired by the camera with the long focus lens onto an imaging plane acquired by the camera with the short focus lens, if the detection results from the selected two tracking sequences respectively are acquired by cameras with different focus lenses, and calculating an Intersection over Union (IoU) of the projected detection results and detection results acquired by the camera with the short focus lens;
    determining an average of the IoUs calculated for the multiple moments; and
    determining the matching of the selected two tracking sequences is successful if the average is greater than a preset threshold.

3. The method according to claim 1, wherein the combining the two random tracking sequences into a combined tracking sequence comprises:
    combining detection results of the two random tracking sequences to obtain a combined tracking sequence.

4. The method according to claim 1, further comprising:
    acquiring a new detection result, and determining whether the new detection result is correlated with the combined tracking sequence;
    creating a new tracking sequence if the new detection result is not correlated with the combined tracking sequence, wherein the new tracking sequence comprises the new detection result; or
    incorporating the new detection result into the combined tracking sequence if the new detection result is correlated with the combined tracking sequence.

5. A device of multi-focal sensing of an obstacle, comprising:
    a camera with long focus lens for acquiring detection results of obstacles;
    a camera with short focus lens for acquiring detection results of obstacles; and
    a controller comprising a memory and a processor, wherein the memory has computer programs stored thereon, and the computer programs are executed by the processor to cause the processor to:
        acquire detection results of the obstacles at multiple moments by utilizing the camera with the long focus lens and the camera with the short focus lens;
        perform a target tracking to the acquired detection results, to obtain at least two tracking sequences, wherein each tracking sequence comprises detection results acquired at the multiple moments for a same obstacle; and
        match two random tracking sequences of the at least two tracking sequences, and combining the two random tracking sequences into a combined tracking sequence, if the matching is successful.

6. The device according to claim 5, wherein the computer programs are executed by the processor to cause the processor to further:
- select the two random tracking sequences from the at least two tracking sequences;
- acquire, for each moment, detection results from the selected two tracking sequences respectively, and project detection results acquired by the camera with the long focus lens onto an imaging plane acquired by the camera with the short focus lens, if the detection results from the selected two tracking sequences respectively are acquired by cameras with different focus lenses, and calculate an Intersection over Union (IoU) of the projected detection results and detection results acquired by the camera with the short focus lens;
- determine an average of the IoUs calculated for the multiple moments; and
- determine the matching of the selected two tracking sequences is successful if the average is greater than a preset threshold.

7. The device according to claim 5, wherein the computer programs are executed by the processor to cause the processor to further:
- combine detection results of the two random tracking sequences to obtain a combined tracking sequence if the matching is successful.

8. The device according to claim 5, wherein the computer programs are executed by the processor to cause the processor to further:
- acquire a new detection result, and determine whether the new detection result is correlated with the combined tracking sequence, creating a new tracking sequence if the new detection result is not correlated with the combined tracking sequence, wherein the new tracking sequence comprises the new detection result, or incorporate the new detection result into the combined tracking sequence if the new detection result is correlated with the combined tracking sequence.

9. A non-transitory computer readable storage medium, in which a computer program is stored, wherein the program, when executed by a processor, causes the processor to execute a method for multi-focal sensing of an obstacle, comprising:
- acquiring detection results of obstacles at multiple moments by utilizing a camera with long focus lens and a camera with short focus lens;
- performing a target tracking to the acquired detection results, to obtain at least two tracking sequences, wherein each tracking sequence comprises detection results acquired at the multiple moments for a same obstacle; and
- matching two random tracking sequences of the at least two tracking sequences, and combining the two random tracking sequences into a combined tracking sequence, if the matching is successful.

* * * * *